Nov. 10, 1925.
C. F. MARSTON
NEUTRAL DEVICE
Filed Dec. 10, 1924
1,561,340
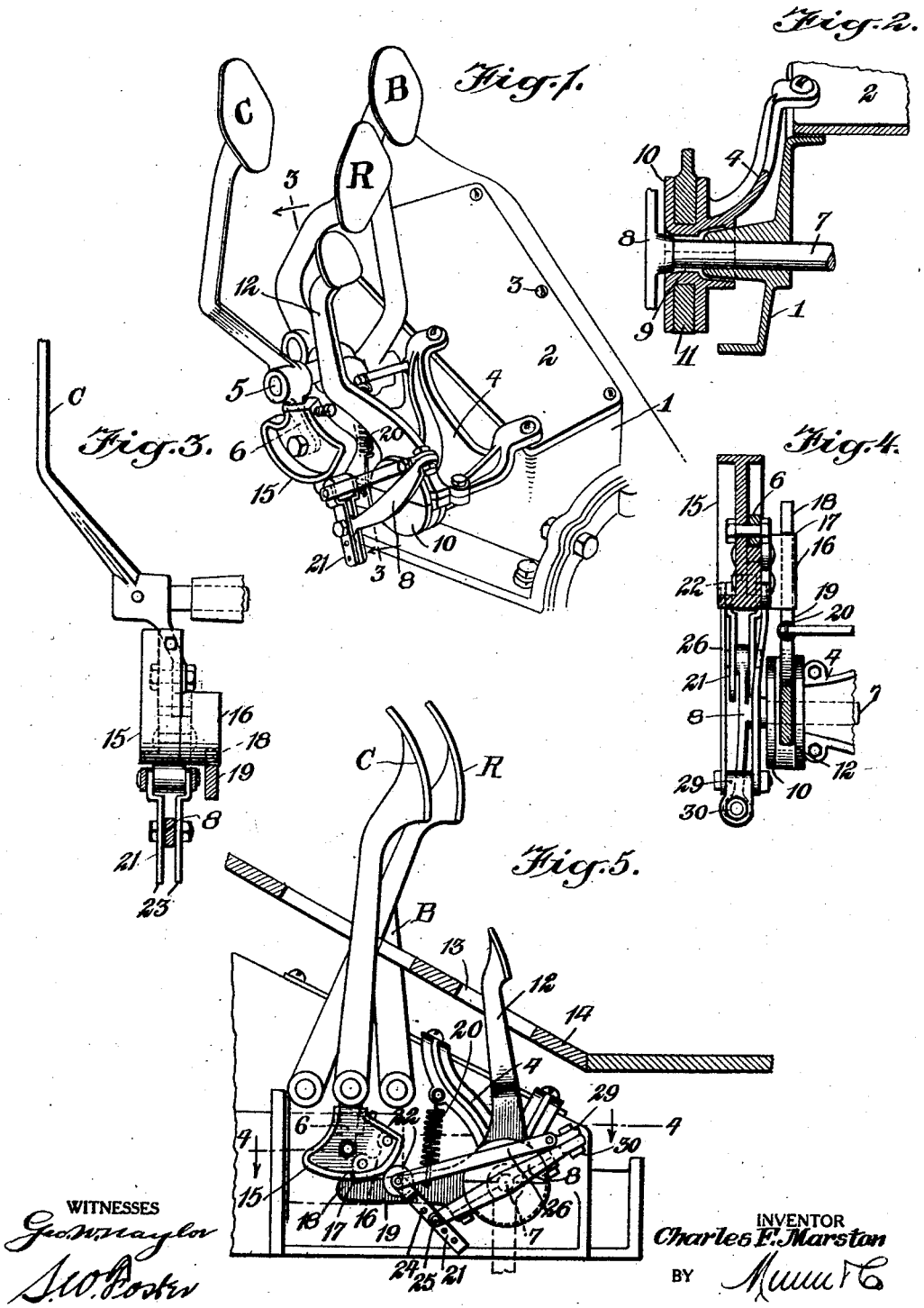

Patented Nov. 10, 1925.

1,561,340

UNITED STATES PATENT OFFICE.

CHARLES F. MARSTON, OF BROOKLYN, NEW YORK.

NEUTRAL DEVICE.

Application filed December 10, 1924. Serial No. 755,008.

*To all whom it may concern:*

Be it known that I, CHARLES F. MARSTON, a citizen of the United States, and a resident of the city of New York, borough of Brooklyn, in the county of Kings and State of New York, have invented a new and Improved Neutral Device, of which the following is a full, clear, and exact description.

This invention relates to an improved neutral device and more specifically to an attachment for Ford motor cars.

An object of the invention is to provide a heel operated pedal, which insures the positioning of the speed control or clutch pedal in neutral position, the device functioning automatically to lock the pedal in neutral position, and foot operated to release the pedal from neutral position.

A further object is to provide an attachment of the character stated in which the several parts thereof may be connected to the ordinary Ford car without altering the construction of the latter, it being of course understood that certain parts rendered unnecessary are omitted when my improvements are installed.

The function of my improved neutral device is to retain the low-high pedal which, for convenience of description, I shall hereinafter refer to as a clutch pedal, in exact neutral position at any desired time without using the ordinary emergency brake with which Ford cars are equipped.

In the ordinary operation of the Ford car, the emergency brake is moved to a halfway position in order to position its cam so that it will hold the clutch lever in neutral. When my improvements are employed, the operation of the emergency brake lever to insure a neutral position is entirely dispensed with, and hence I can employ an emergency brake lever of any desired length, having any desired movement, to apply the emergency brake as quickly as desired, and as a matter of fact I employ such lever for braking purposes only.

With the standard Ford construction in coasting the operator presses the clutch pedal with his left foot to a point where he judges neutral to be and presses the brake pedal with his right foot. He must then continue to hold the clutch pedal in neutral or reach over and pull the emergency brake while waiting for traffic to resume, such emergency brake, by the way, being almost out of reach in its off position. The driver of the car with my improved neutral device will press the clutch pedal until he feels it engage neutral, and presses the pedal with his right foot. The driver can then remove his feet from the pedals and rest.

When reversing with my improved attachment, the operator needs but to press the reverse pedal, after permitting the clutch pedal to engage neutral. Therefore, the driver can turn more freely to look rearwardly than is possible while engaging both feet with the pedal, the latter procedure being necessary on the standard Ford car.

Another feature of this improved device is that when obliged to stop the car on a steep grade and he cannot depend on the emergency brakes to hold the car, the operator can then stop the motor and move the clutch pedal into high speed and apply the emergency brakes. He will then have a double brake. With standard Ford construction it would be impossible to use the motor for braking after applying the emergency brake.

With my improved attachment the low speed band linings will last longer as the driver no longer guesses the whereabouts of neutral but secures it instantly, thereby eliminating all unnecessary friction and drag on the band. An equal saving is effected on the foot brake band lining due to the fact that the average driver of a Ford car presses the clutch pedal too far in seeking neutral, thereby contracting the low speed band which continues to exert a forward pull on the car in opposition to the braking effect of the foot brake thus wearing both low and foot brake unnecessarily.

The standard Ford emergency brake functions as a brake for about 50 per cent of the arc described, as the first half of its travel is used to disengage the direct drive clutch or high to the neutral point. Therefore, in an emergency when quick action is of vital importance, the brakes do not come into action until the operator has pulled the lever half way. I can therefore utilize in connection with my improved attachment a brake lever considerably longer than the standard Ford lever, which can be grasped without bending the body. This improved brake lever can be used only when a neutral attachment is employed as the latter eliminates the necessity of the brake lever passing under the dash in its off position, which it must do on the standard Ford car. Furthermore, with my improved attachment insuring a proper neutral position, the car can be manually pushed or moved with much more ease than possible heretofore.

With these and other objects in view, the invention consists in certain novel features of construction and combinations and arrangements of parts which will be more fully hereinafter described and pointed out in the claims.

In the accompanying drawings—

Figure 1 is a perspective view illustrating my improvement attached to a Ford car of standard construction, showing the same in connection with the features of the Ford car, with which they co-operate;

Figure 2 is a fragmentary view in section showing a portion of the clutch shaft, the transmission housing, and portions of my improved attachment adjacent thereto;

Figure 3 is a view in section on the line 3—3 of Figure 1;

Figure 4 is a view in section on the staggered line 4—4 of Figure 5;

Figure 5 is a view in side elevation showing the position of the parts when the clutch lever is held in neutral position.

C represents the clutch pedal, R the reverse pedal, and B the brake pedal, which are the ordinary pedals employed for controlling Ford cars.

1 represents the transmission casing having a cover plate 2 which is secured by screws 3, and I utilize certain of these screws at one side of the transmission housing to secure a bracket 4 thereon.

As my invention has particularly to do with this control of the clutch pedal with specific reference to the neutral position thereof, the description hereinafter will be directed more particularly to the operation of this pedal as the operation of the other pedals is the same as in the standard type of Ford car.

The clutch pedal 3 is mounted and secured upon the slow speed shaft 5 and has a crank arm 6 projecting below the shaft, which is ordinarily connected by an adjustable link with a crank arm on the clutch lever shaft 7, but I dispense with this link and crank arm and substitute my improved attachment in lieu thereof.

On the clutch lever shaft 7 I secure the crossbar 8 which constitutes a part of the ordinary Ford car construction, and term this a crossbar because it is fixed intermediate its ends to the shaft, as clearly shown in Figure 1. The bracket 4 above referred to has an opening 9 through which the shaft 7 projects, and concentric with this opening the bracket is formed with a double or parallel flange split bearing 10 in which the hub 11 of my improved heel pedal 12 has movable mounting. This heel pedal 12 projects through a slot 13 in the foot board 14 and is located substantially in line with the clutch pedal C and is shorter than the clutch pedal so that its upper end is in convenient position to receive the heel of the foot while the main portion of the foot can engage the clutch pedal.

On the crank arm 6 above referred to I secure a cam 15 and on one side of this cam I secure a plate 16, one end of which constitutes a shoulder 17 against which a tooth 18 on a dog 19 is adapted to be engaged. This dog 19 constitutes a fixed or integral part of the heel pedal 12 and is located at an angle to the heel pedal, so that the pedal and dog constitute in reality a bell crank lever. A coil spring 20 connects the dog 19 with the bracket 4 so as to exert sufficient pressure on the dog to hold it in locking engagement with the clutch lever.

A link 21 is employed on which a roller 22 is mounted to engage the working face of the cam 15. This link 21 preferably comprises a pair of bars 23 having a series of openings 24 therein adapted to receive in any of them a cross pin 25 projected through the bar 8 so as to permit of a certain amount of adjustment necessary for best results. For convenience of description I shall hereinafter refer to this part 21 as a link carrying the roller 22.

The link 21 at its roller carrying end is connected by a bar 26 with the end bar 8, the connection being illustrated as comprising a small bracket 29 pivotally connected to the bar 26 and fixed to the bar 8 by a cross bolt 30. It will thus be noted that the bars 8 and 26 and the link 21 constitute a triangular frame which is rigid, so far as the separate parts are concerned, and which offer a rigid mount for the roller 21, and the latter is held against the working face of the cam 15 by the strong spring which controls the operation of the shaft 7 and which forms a part of the standard Ford construction and hence need not be illustrated in detail.

In Figures 1 and 5 I illustrate the parts in neutral position and it will be noted that the dog 19 has a locked engagement with the clutch pedal so as to hold the same against movement in a direction which will throw this pedal into high. It will also be noted that the tooth 18 offers no resistance to the movement of the clutch pedal toward low position.

To release the clutch pedal the heel pedal 12 is moved forwardly and moving the dog 19 out of engagement with the cam 15, and permitting the roller 22 to ride along the working face of the cam and force the clutch lever into its high position. It will be noted that, when the lever is moved forwardly from its high position toward its low position, when it reaches the neutral point, the dog 19 will spring into engagement with the pedal and this movement and contact will be felt by the operator, so that he knows absolutely that the pedal is in neutral position.

In the objects and statements of the invention appearing at the beginning of this specification I have gone into considerable length as to some of the purposes and advantages and the operation of the device which are unnecessary to here repeat, as I do not wish to be limited to the precise manner of operating the pedal but desire to cover broadly the pedal, preferably a heel operated pedal, which controls a means for locking the clutch pedal in neutral position together with a means, such as roller 22 and its mounting, for positively moving the clutch pedal into high position when the clutch pedal is released from neutral position by the movement of the heel pedal.

Various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:

1. The combination with a clutch pedal, a cam on the clutch pedal, a heel pedal having a fixed member thereon, a dog on the heel pedal adapted to engage the member on the cam and hold the clutch pedal in neutral position, and a pressure roller engaging the face of the cam and adapted to move the clutch pedal from neutral into high speed position when the dog is released from its holding position by the operation of the heel pedal.

2. An attachment for an automobile including a support adapted to be connected to the clutch lever shaft, a cam on the clutch pedal, a roller carried by said support engaging the face of the cam and tending to move the clutch pedal from neutral to high position, and a foot operated device adapted to hold the clutch pedal in neutral position.

3. An attachment for an automobile including a support adapted to be connected to the clutch lever shaft, a cam on the clutch pedal, a roller carried by said support engaging the face of the cam and tending to move the clutch pedal from neutral to high position, a heel pedal having pivotal mounting concentric with the clutch shaft, a member on the cam, and a dog constituting an integral part of the heel pedal and engaging the member on the cam to hold the clutch pedal in neutral position.

4. An attachment for an automobile including a support adapted to be connected to the clutch lever shaft, a cam on the clutch pedal, a roller carried by said support engaging the face of the cam and tending to move the clutch pedal from neutral to high position, a heel pedal having pivotal mounting concentric with the clutch shaft, a member on the cam, a dog constituting an integral part of the heel pedal and engaging the member on the cam to hold the clutch pedal in neutral position, and a spring exerting pressure on the dog and tending to hold the same in locked engagement with the cam.

5. An attachment for an automobile including a bracket adapted to be secured to the transmission housing a cam adapted to be secured to the clutch pedal, a heel pedal pivotally mounted on the bracket, a fixed member on the cam, a dog constituting a fixed part of the heel pedal and adapted to engage the said fixed member on the cam and hold the clutch pedal in neutral position, a support fixed to turn with the clutch shaft, a roller on said support engaging a cam and adapted to move the clutch pedal from neutral to high-speed position when the dog is released, and a spring exerting pressure on the dog to hold it in locked position.

6. An attachment of the character described, including a cam adapted to be connected to the clutch lever of an automobile, a bar fixed to turn with the clutch shaft of the car, a link adjustably connected to one end of the bar, a second bar connecting the link with the opposite end of the first-mentioned bar, a roller at the juncture of the link and the last-mentioned bar and operatively engaging the face of said cam, a heel pedal, a fixed member on the cam, and a spring pressed dog on the heel pedal adapted to engage the said fixed member on the cam and hold the clutch pedal in neutral position.

CHARLES F. MARSTON.